United States Patent [19]
Weatherall et al.

[11] Patent Number: 6,086,806
[45] Date of Patent: *Jul. 11, 2000

[54] METHOD OF SPLICING THERMOPLASTIC ARTICLES

[75] Inventors: Douglas J. Weatherall; Andrew O. Kenny, both of North York, Canada; Ronald H. Ball, 1083 Beaufort Ave., Oshawa, Ontario, Canada, L1G 1G8; A. Stuart Caunce, Scarborough; David S. Ball, Courtice, both of Canada

[73] Assignee: Ronald H. Ball, Oshawa, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/628,203

[22] Filed: Apr. 5, 1996

[51] Int. Cl.⁷ .................................................. B29C 65/02
[52] U.S. Cl. ......................... 264/152; 264/248; 156/304.5
[58] Field of Search ...................................... 264/152, 248, 264/156; 425/508; 156/304.2, 304.5, 304.6

[56] References Cited

U.S. PATENT DOCUMENTS

| Re. 27,439 | 7/1972 | Jackson et al. . |
|---|---|---|
| 1,049,613 | 1/1913 | Seeberger . |

(List continued on next page.)

FOREIGN PATENT DOCUMENTS

| 898726 | 4/1972 | Canada . |
|---|---|---|
| 936569 | 11/1973 | Canada . |
| 1048301 | 2/1979 | Canada . |
| 1261583 | 9/1989 | Canada . |
| 0 020 915 | 1/1981 | European Pat. Off. . |
| 0 134 545 | 3/1985 | European Pat. Off. . |
| 0 185 006 | 6/1986 | European Pat. Off. . |
| 0 273 479 | 6/1988 | European Pat. Off. . |
| 2161856 | 7/1973 | France . |
| 2 330 518 | 6/1977 | France . |
| 2442935 | 6/1980 | France . |
| 2 535 337 | 5/1984 | France . |
| 2 679 171 | 1/1993 | France . |
| 839624 | 5/1952 | Germany . |
| 860477 | 12/1952 | Germany . |
| 907 966 | 4/1954 | Germany . |
| 1027539 | 4/1958 | Germany . |
| 1127279 | 4/1962 | Germany . |
| 1019958 | 12/1964 | Germany . |
| 1936192 | 6/1971 | Germany . |
| 2 000 266 | 7/1971 | Germany . |
| 21 42 098 | 3/1973 | Germany . |
| 29 11 753 | 10/1980 | Germany . |
| 29 16 253 | 10/1980 | Germany . |
| 31 06 253 | 9/1982 | Germany . |

(List continued on next page.)

OTHER PUBLICATIONS

Elevator World, Patents, Dec. 1990 p.87.

*Primary Examiner*—Jan H. Silbaugh
*Assistant Examiner*—Edmund H. Lee
*Attorney, Agent, or Firm*—Bereskin & Parr

[57] ABSTRACT

A method and apparatus are provided for forming a joint in an elongate article formed from a thermoplastic material, for example an escalator handrail or a conveyor belt, which also includes a plurality of reinforcing cables and a slider fabric. End parts of the article are held in a mold and heated to remelt the material. Portions adjacent the end parts are chilled, at ends of the mold, to prevent remelting. The molten end parts then fuse, and the molten joint is then cooled to resolidify the material and form the joint. With reinforcing cables being present, these can be cut into an interlace pattern, which advantageously is provided in just a layer of the article rather than extending through the full depth of the article. A top layer can then be replaced by a separate top cap of the material of the body of the article. Where a slider is present, to provide an effective interlacing effect, a bottom layer or portion of a handrail is cut at an inclined angle, to form an inclined joint in the slider.

24 Claims, 11 Drawing Sheets

U.S. PATENT DOCUMENTS

| | | | |
|---|---|---|---|
| 1,101,209 | 6/1914 | Pitt . | |
| 1,186,550 | 6/1916 | Cobb . | |
| 1,735,686 | 11/1929 | Kimmich . | |
| 2,182,169 | 12/1939 | Bierer | 156/304.5 |
| 2,373,764 | 4/1945 | Lautrup et al. . | |
| 2,669,339 | 2/1954 | Hansen . | |
| 2,670,313 | 2/1954 | Young | 264/327 |
| 2,721,158 | 10/1955 | Mans . | |
| 2,738,826 | 3/1956 | Clingman et al. . | |
| 2,834,395 | 5/1958 | Russell et al. . | |
| 2,879,881 | 3/1959 | Tilton . | |
| 2,956,662 | 10/1960 | Hansen . | |
| 2,979,431 | 4/1961 | Perrault . | |
| 3,048,256 | 8/1962 | Skinner . | |
| 3,101,290 | 8/1963 | Paul . | |
| 3,212,627 | 10/1965 | Beebee . | |
| 3,411,980 | 11/1968 | Leshin . | |
| 3,414,109 | 12/1968 | Clark . | |
| 3,463,290 | 8/1969 | Tajima . | |
| 3,481,807 | 12/1969 | Kanamori . | |
| 3,487,871 | 1/1970 | Kanamori | 156/304.5 |
| 3,623,590 | 11/1971 | Johnson . | |
| 3,633,725 | 1/1972 | Smith . | |
| 3,634,167 | 1/1972 | Plontke . | |
| 3,689,341 | 9/1972 | Ninomiya | 156/304.5 |
| 3,693,218 | 9/1972 | Jaubert et al. . | |
| 3,724,645 | 4/1973 | Spaar . | |
| 3,778,882 | 12/1973 | Cameron et al. . | |
| 3,783,063 | 1/1974 | Olsson | 156/304 |
| 3,783,704 | 1/1974 | Lawson . | |
| 3,865,225 | 2/1975 | Phal . | |
| 3,872,735 | 3/1975 | Hnatek . | |
| 3,874,968 | 4/1975 | Robinson . | |
| 3,885,071 | 5/1975 | Blad et al. . | |
| 3,936,345 | 2/1976 | Pecha . | |
| 3,949,858 | 4/1976 | Ballocci et al. . | |
| 3,956,056 | 5/1976 | Boguslawski et al. . | |
| 3,981,206 | 9/1976 | Miranti, Jr. et al. . | |
| 4,032,384 | 6/1977 | Rauscher . | |
| 4,034,617 | 7/1977 | Guyer . | |
| 4,050,322 | 9/1977 | Moring . | |
| 4,087,223 | 5/1978 | Angioletti et al. . | |
| 4,161,769 | 7/1979 | Elliott . | |
| 4,169,393 | 10/1979 | Wetzel et al. . | |
| 4,274,821 | 6/1981 | Kiemer . | |
| 4,279,676 | 7/1981 | Morrison et al. | 156/304.5 |
| 4,359,501 | 11/1982 | Ditullio . | |
| 4,381,273 | 4/1983 | Azzola . | |
| 4,427,107 | 1/1984 | Roberts et al. . | |
| 4,439,387 | 3/1984 | Hawley . | |
| 4,453,910 | 6/1984 | Ball . | |
| 4,469,729 | 9/1984 | Watanabe et al. . | |
| 4,548,663 | 10/1985 | Worcester . | |
| 4,563,140 | 1/1986 | Turecek . | |
| 4,564,542 | 1/1986 | Worcester . | |
| 4,578,024 | 3/1986 | Sicka et al. . | |
| 4,600,549 | 7/1986 | Rajala et al. . | |
| 4,618,387 | 10/1986 | Fisher et al. | 156/244.11 |
| 4,650,446 | 3/1987 | Pinto et al. . | |
| 4,681,646 | 7/1987 | Pinto et al. . | |
| 4,767,244 | 8/1988 | Peterson . | |
| 4,776,446 | 10/1988 | Fisher et al. . | |
| 4,792,374 | 12/1988 | Rianda . | |
| 4,839,220 | 6/1989 | Stijntjes et al. . | |
| 4,852,713 | 8/1989 | Tatai et al. . | |
| 4,891,040 | 1/1990 | Nagai et al. . | |
| 4,934,100 | 6/1990 | Adell . | |
| 4,946,020 | 8/1990 | Rivera et al. . | |
| 4,948,354 | 8/1990 | Minaudo . | |
| 4,957,199 | 9/1990 | Wokke et al. . | |
| 5,020,256 | 6/1991 | French . | |
| 5,083,985 | 1/1992 | Alles . | |
| 5,115,900 | 5/1992 | Nurnberg et al. . | |
| 5,160,009 | 11/1992 | Iyoda et al. . | |
| 5,162,151 | 11/1992 | Smith et al. . | |
| 5,165,643 | 11/1992 | Shreiner . | |

FOREIGN PATENT DOCUMENTS

| | | |
|---|---|---|
| 31 13 810 | 10/1982 | Germany . |
| 31 46 220 | 3/1983 | Germany . |
| 32 08 916 | 9/1983 | Germany . |
| 34 33 914 | 3/1986 | Germany . |
| 37 04 524 | 2/1989 | Germany . |
| 39 21 887 | 1/1991 | Germany . |
| 39 21 888 | 1/1991 | Germany . |
| 39 30 351 | 3/1991 | Germany . |
| 40 38 656 | 7/1991 | Germany . |
| 4 118 946 | 5/1992 | Germany . |
| 43 37 737 | 11/1994 | Germany . |
| 52-16629 | 5/1977 | Japan . |
| 55-166548 | 12/1980 | Japan . |
| 58-171594 | 10/1983 | Japan . |
| 58-207542 | 12/1983 | Japan . |
| 58-222833 | 12/1983 | Japan . |
| 59-85728 | 5/1984 | Japan . |
| 62-189147 | 8/1987 | Japan . |
| 02284177 | 11/1990 | Japan . |
| 2-277848 | 11/1990 | Japan . |
| 4-106092 | 4/1992 | Japan . |
| 4-185788 | 7/1992 | Japan . |
| 4-194011 | 7/1992 | Japan . |
| 7-206351 | 8/1995 | Japan . |
| 1 039 898 | 8/1966 | United Kingdom . |
| 1 355 039 | 5/1974 | United Kingdom . |
| 1 399 943 | 7/1975 | United Kingdom . |
| 2243163 | 10/1991 | United Kingdom . |

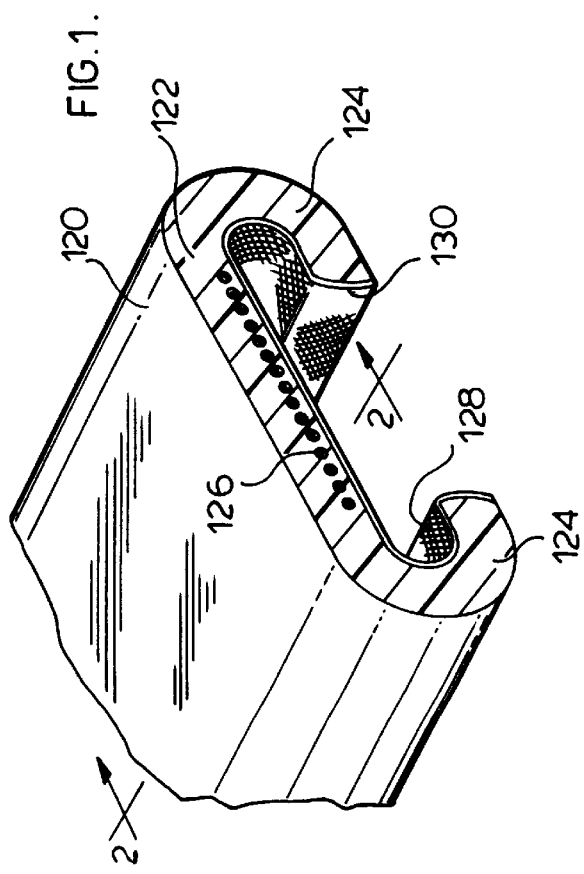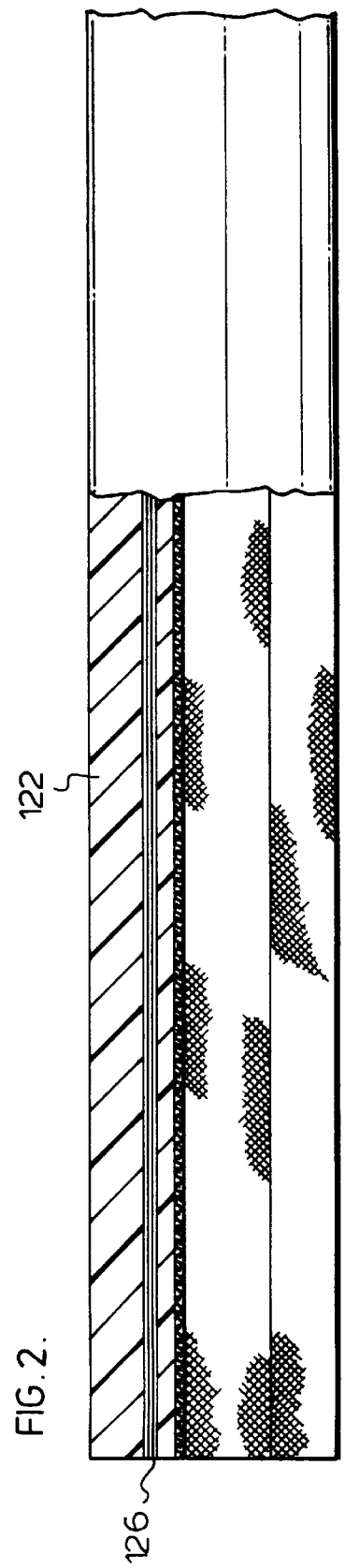

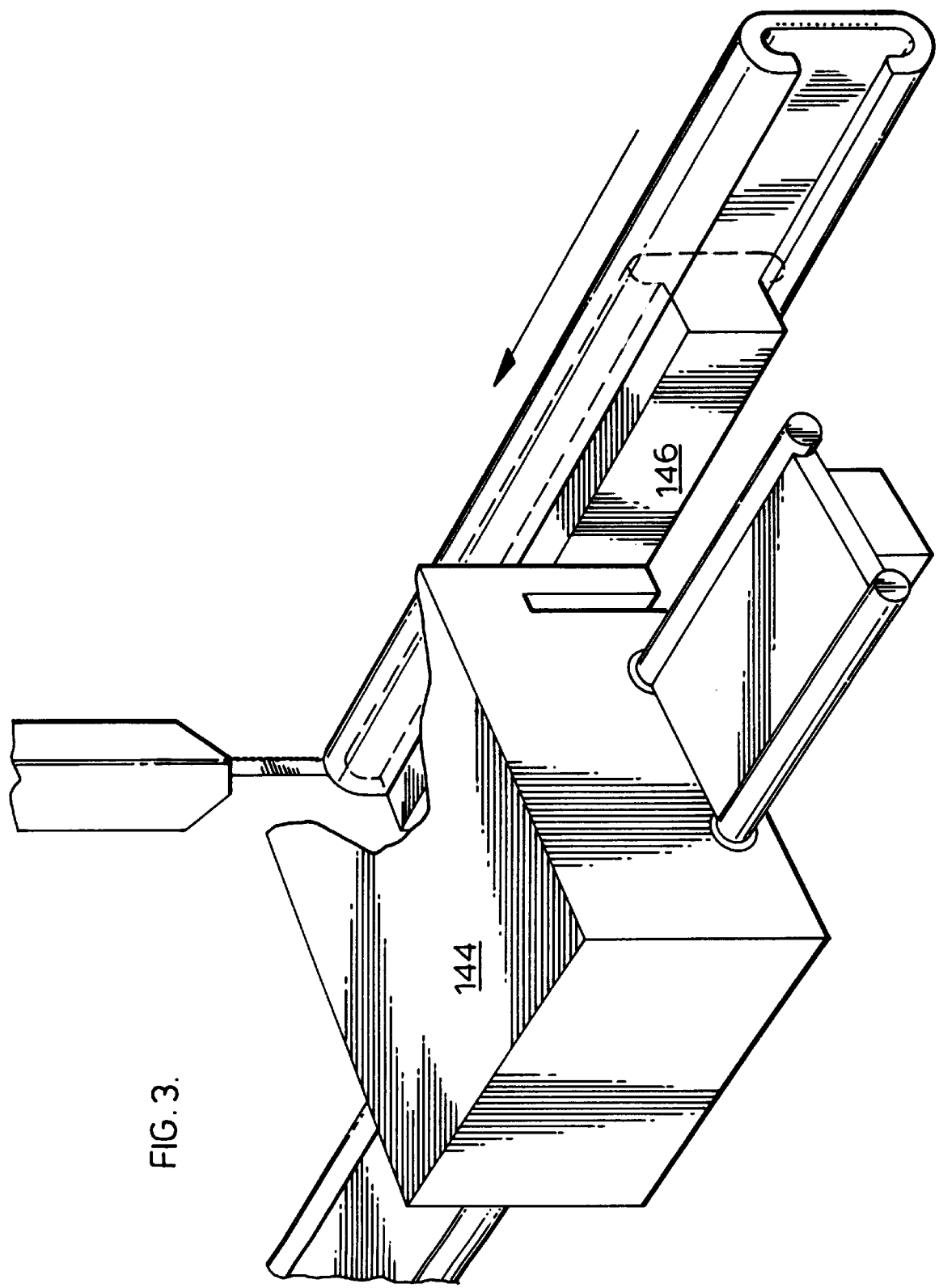

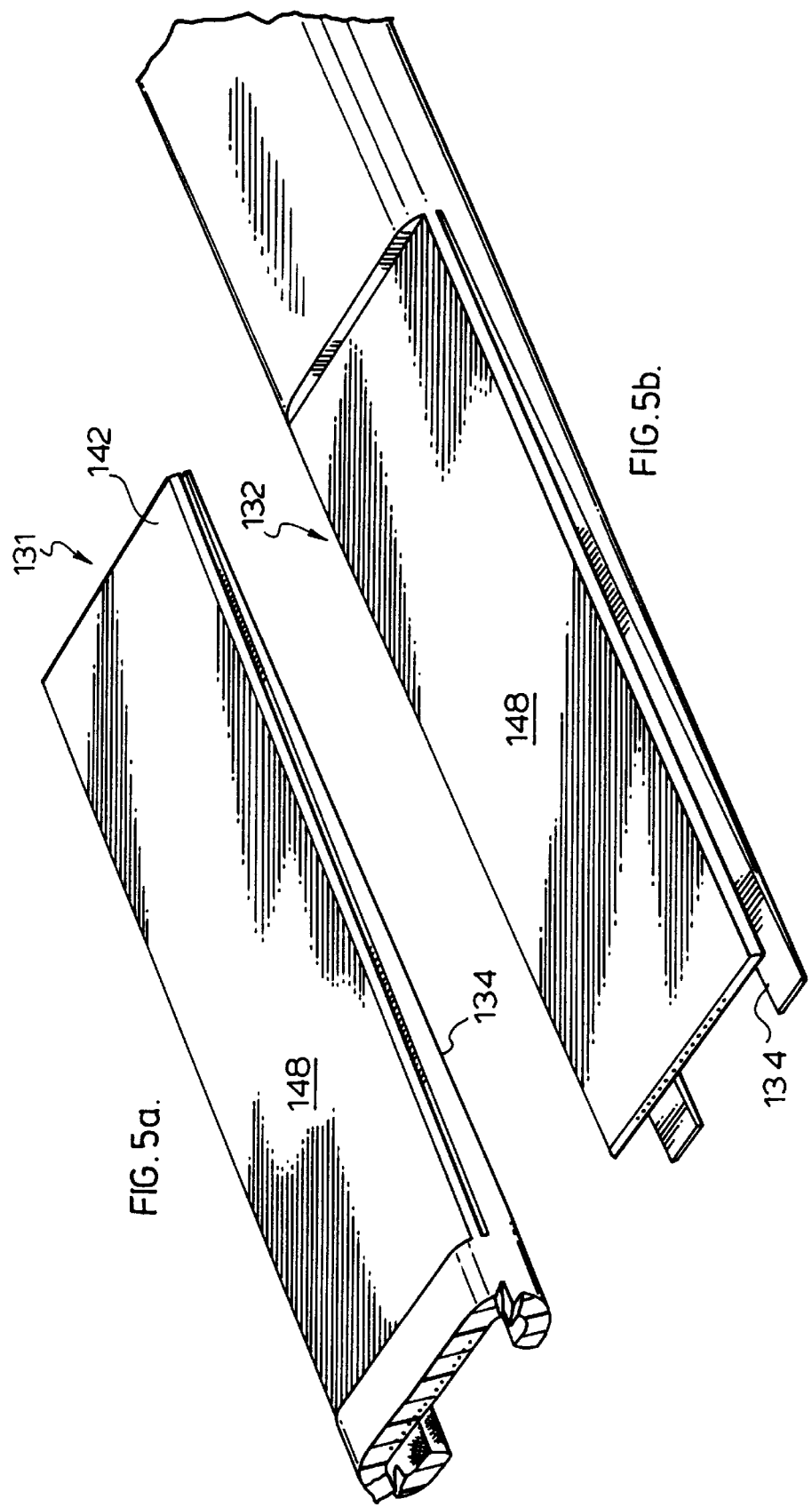

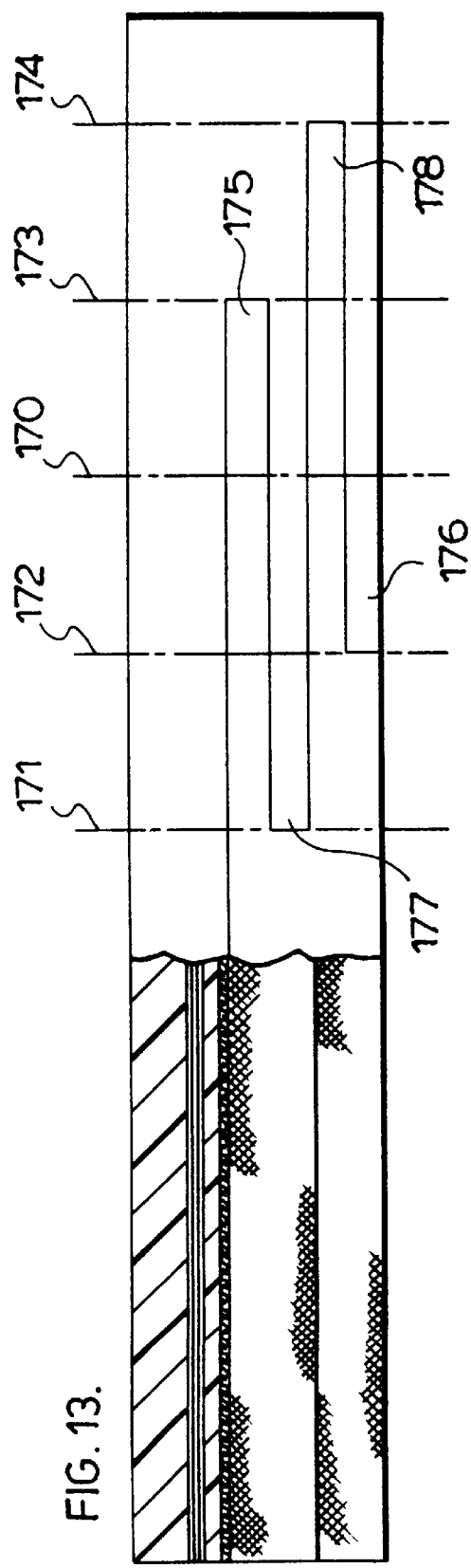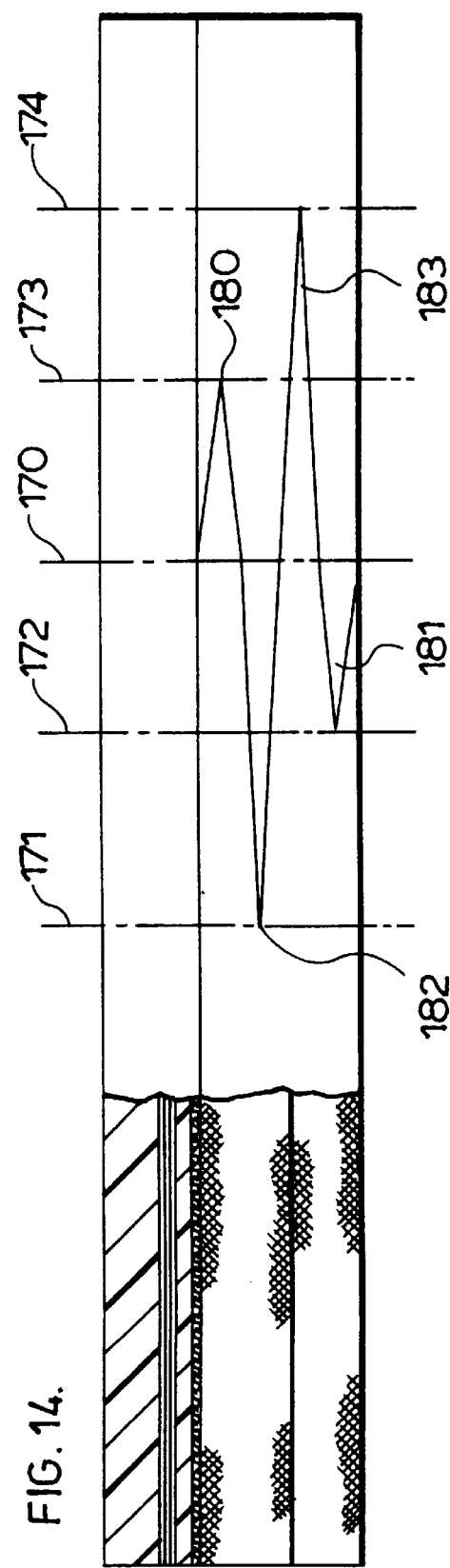

METHOD OF SPLICING THERMOPLASTIC ARTICLES

FIELD OF THE INVENTION

This invention relates to a method of and an apparatus for splicing articles formed from a thermoplastic material, such as a handrail for an escalator or the like. This invention more particularly relates to a method and apparatus for splicing together extruded articles including a plurality of elongate inextensible members and a slider fabric layer, such as handrail sections or conveyor belts.

BACKGROUND OF THE INVENTION

Handrails for escalators, moving walkways and other transportation apparatus are usually produced in indefinite lengths. A conventional handrail has three main components, namely the main body of the handrail, which is commonly formed from a rubber or other thermoset material; a plurality of steel, reinforcing cables, which act as a stretch inhibitor to define a neutral axis and to give the handrail a desired stiffness in a longitudinal direction, while enabling it to flex in a vertical direction, so as to be capable of travelling around pulley wheels, drive mechanisms etc; and a slider fabric that is commonly bonded to the handrail within a T-shaped channel on the bottom of the handrail, the function of the slider being to provide a low coefficient of friction between the handrail and a supporting and correspondingly shaped guide. Conventional handrails also commonly included various layers of fabric reinforcement.

Conventionally, handrails have been produced in a piece wise fashion. As the main material of the handrail body is a thermoset material, this has caused little difficulty. After production of each section within a mold, the handrail is moved forward, and the next section formed after it.

For a particular application, to form a splice at an installation site, a so-called "field splice", an appropriate length of handrail is selected, and the ends prepared for splicing together. Commonly, this involves cutting the ply containing the steel cables and interlacing them. The slider fabric is cut appropriately. The ends are then assembled in a mold, the mold is filled with fresh material, and the mold is then heated, to cause the material to set.

In production of the handrail, if the length required is known, then in the factory a "factory splice" can be made. A length of handrail is produced with the ends left uncured, so that an invisible, smooth splice can be made using a production mold.

Proposals have been made for forming handrails for escalators and the like from a thermoplastic polymeric material, such as polyurethane, and one example is shown in U.S. Pat. No. 4,618,387 (Fisher et al.) assigned to Westinghouse Electric Corp. It is first noted that the practical utility of this method is questioned, since the patent only shows and describes a C-shaped section for a handrail having the main body formed from the elastomeric material and a plurality of steel cables or other inextensible members. No mention is made of the fabric slider that, as a practical matter, is required for any conventional handrail. It is not seen how even a test loop of handrail could have been made and tested, if the slider was not present. To applicant's knowledge, there is no practical way of bonding this slider to the handrail after formation of a complete handrail loop, nor indeed after the forming of any length of handrail. It has, to applicant's knowledge, to be formed with the handrail at the time that the other elements of the handrail are assembled.

In any event, the main proposal in this U.S. Pat. No. 4,618,387 is to cut the two ends of the handrail square, and then heat fuse them together. It is not clear how this is intended to be effective, but it is suggested that as the interfaces are short, only a small amount of elastomeric material will extrude from the periphery of the joint and require removal.

This method by itself is believed to be almost certainly inadequate, and indeed, a test sample prepared by the present inventors showed that a distinct plastic hinge developed at the break in the steel cables. A large part of the strength of a handrail is derived from the steel reinforcing cables. A simple, square butt joint would require the elastomeric material to provide the strength across the joint, and this would be unacceptable. To allow for this, the disclosed method also provides for cutting a number of longitudinally extending, parallel grooves between the existing cables. Short lengths of the cables are then placed in the grooves and a thin sheet of material is disposed over the grooves. Heat is then applied to the sheet on the joint area to cause the sheet to melt and flow into the grooves to surround them. Again, it is not entirely clear how it is intended for this to be achieved, nor how the correct profile would be maintained. Such a technique is clearly impossible when the slider is present and if the slider is to be continuous, and it is clear that this method can only readily be practised on a handrail assembly without the slider fabric.

A further disadvantage to this technique is that, in the area of the joint, there will be, approximately, twice the density of reinforcing cables as in the rest of the handrail, giving the joint area a stiffness and flexing characteristic quite different from the rest of the handrail, which it is believed would result in unusual and undesirable wear characteristics. It is suggested this can be alleviated by feathering the joint, but this would simply relieve the abrupt change in stiffness, rather than eliminating it.

The problem of splicing together the ends of a selected length of an endless member is known in many other fields of technology. In particular, there are many proposals in the conveyor belt field for splicing belts together. U.S. Pat. No. 3,481,807 is one example, which shows various interlacing techniques. It shows cutting of reinforcing cables so that the junctions in individual cable runs are staggered along the length of the belt. It also shows this characteristic for outer cables, combined with overlapping or interlacing of ends of inner cables. This method is intended to be applied to a rubber belt, with a covering material that can be replaced and vulcanized. It does not address the problem of applying this technique to a belt formed from a thermoplastic material, particularly the problem that the whole body of a thermoplastic belt could melt and run away if it is heated without being contained.

SUMMARY OF THE INVENTION

The present inventors have developed a method and apparatus for continuous extrusion of an article of constant cross-section, such as a handrail section or a conveyor belt. For a handrail, it includes all the main elements of a conventional handrail, namely the main body formed from a polymeric material, the slider and the reinforcing cables or stretch inhibitor. This extrusion technique can be optimised to provide a good bond strength between the cables and the thermoplastic material, good peel strength between the slider fabric and the thermoplastic and between the various layers of thermoplastic, and good lip strength for the lips of the handrail.

Accordingly, it is desirable to provide a method and apparatus for splicing together selected lengths of such an extruded handrail. Ideally, the method should provide for formation of a joint that is largely undetectable to a user. Moreover, it is desirable that the spliced joint provide the same high or good bond strength for the cables, peel strength for the slider fabric and thermoplastic layers, and lip strength as in the extruded handrail, and that the integrity of the body be retained in the splice area.

Many, although not all, thermoplastic materials are strongly hygroscopic. For such materials, it is necessary to maintain sufficient pressure that retained water does not vaporize.

In accordance with one aspect of the present invention, there is provided a method of forming a joint in an elongate article, which is of generally uniform cross-section, is formed from a thermoplastic material and has end parts and which includes a plurality of elongate inextensible members, the method comprising the steps of:

(1) providing a mold comprising first and second mold parts displaceable between open and closed configurations and a mandrel having a cross-section corresponding to the internal T-shaped slot of the handrail, the mandrel being mountable between the first and second mold parts, whereby the first and second mold parts and the mandrel define an elongate mold cavity with a cross-section corresponding to the cross-section of the handrail, and the two mold parts being separable and displaceable relative to one another in a direction generally perpendicular to the elongate mold cavity;

(2) cutting the inextensible members in each end part to at least two different lengths together with a corresponding portion of the material of the body of the handrail, to form an interlace pattern at the joint, with the inextensible members terminating in a plurality of planes transverse to the elongate handrail, wherein said corresponding portions are cut such that the ends of the elongate inextensible members are aligned with one another and such that a bond between the elongate inextensible members and the thermoplastic material is not disturbed;

(3) inserting the mandrel into the T-shaped slot of the end parts, interlacing said corresponding portions together such that there are no substantial voids and enclosing the end parts of the handrail and the mandrel within the mold cavity;

(4) while maintaining portions of the handrail adjacent the end parts cool to prevent melting thereof, heating the end parts of the handrail around the mandrel to melt the thermoplastic material, thereby to form molten end parts and to fuse the end parts together, and simultaneously pressing the two mold parts together into the closed configuration to pressurize the molten end parts within the mold cavity;

(5) while continuing to maintain said portions of the handrail adjacent the end parts cool and pressing the mold parts together, cooling the molten end parts of the handrail to resolidify the thermoplastic material and to form a joint in the handrail; and (6) opening the first and second mold parts and removing the mandrel from the T-shaped slot.

The mold has a cavity that corresponds to the cross-section of the article in the sense that they have similar and related profiles, although it is not essential for the dimensions of both the mold cross-section and the cross-section of the handrail to be identical. As detailed below, at least for some materials and applications, it is advantageous to have the mold slightly oversized with respect to the profile of the article and this has been found to give good results.

Preferably, the method is applied to an elongate article including a plurality of elongate inextensible members, wherein the method includes the additional step of, prior to step (1), cutting the inextensible members to at least two different lengths, to form an interlace pattern at the joint, with the inextensible members terminating in a plurality of planes transverse to the elongate article. As the material is a thermoplastic, the elongate inextensible members or cables are preferably cut with a corresponding portion of the material of the body of the article, whereby where the cable end parts are interlaced there are no substantial voids in the body of the material.

In a preferred aspect of the present invention, the method is applied to an elongate handrail having a generally C-shaped external section and defining an internal T-shaped slot, and including an internal slider fabric around the T-shaped slot, the handrail having, in a cross-section, a main top portion and side legs extending down there from around the T-shaped slot with the inextensible members being located in the top portion above the T-shaped slot, wherein the method comprises forming the interlace pattern in the top portion of the handrail.

In accordance with another aspect of the present invention, there is provided an apparatus for forming a joint in an elongate article of substantially uniform cross-section and formed from a thermoplastic material, the apparatus comprising a mold defining an elongate cavity having a cross-section corresponding to the cross-section of the elongate article, which mold comprises a central section and first and second end sections on either side of the central section; a main heating means for heating end parts of the article in the central section of the mold to cause remelting and fusing of the end parts of the article; a main cooling means for cooling the end parts of the article to resolidify the material and form the joint; and end cooling means, for the first and second end sections, for cooling portions of an elongate article adjacent the end parts thereof, to prevent melting, wherein the mold comprises at least two parts which are displaceable between an open configuration in which an article can be inserted into the mold and a closed configuration for forming a joint.

In a preferred aspect of the invention, the main heating means, the main cooling means and the end cooling means are all integral with the mold. Conveniently the cooling means are provided by appropriate ducts in the central and end sections of the mold, through which cooling water flows. The heating means is provided by ducts within the central section in which elongate electric heating elements are located. However, it is conceived that the heating and/or the cooling means could be separate from the mold, and more particularly could be incorporated in press platens used to maintain the mold closed. This would then simplify the design of the mold, although the thermal paths for heating and cooling would likely be longer.

Preferably, the mold comprises a top part and a bottom part, wherein the top part of the mold comprises top parts of the main central section and of the first and second end sections, and the bottom part of the mold comprises bottom parts of the main central section and of the end sections. More preferably, the top parts of the end sections are joined to the top part of the central section but are generally thermally insulated therefrom, and the bottom parts of the end sections are joined to the bottom part of the central section but are generally thermally insulated therefrom. Conveniently, this is achieved, by integrally forming the top parts of the central section and the end sections from metal, with the parts joined by a narrow web providing insulation, with the bottom formed similarly.

Advantageously, each of the top and bottom parts of each of the end and central sections includes a duct means, for passage of a liquid coolant. The duct means preferably comprises suitably arranged bores extending through the various sections. Also, the top and bottom parts of the central section advantageously include second elongate bores and heating elements located in the second elongate bores, as the heating means.

Preferably, the apparatus is adapted for forming a joint in an elongate handrail having a generally C-shaped external section and defining an internal T-shaped slot, and comprising a main body formed of a thermoplastic material, a stretch inhibitor reinforcing the handrail, and a slider fabric bonded to the main body and around the T-shaped slot, wherein the apparatus includes an elongate mandrel extending through the central and end sections and having a profile corresponding to the T-shaped slot. The apparatus can also be configured to form a joint in a conveyor belt.

In the handrail as originally extruded, it is preferred for the cables to be coated with an adhesive, to provide a good bond strength between the cables and the thermoplastic elastomer. This bond strength can be maintained, by cutting the interlaced pattern so as to leave thermoplastic around the end part of each cable, and without removing or damaging the adhesive coating on each cable end part.

In the original extrusion, it has been found that providing elevated temperatures for both the slider fabric and the thermoplastic are essential to obtaining good peel strength. The reasons for this are not fully understood, but it is believed that the elevated temperature provides an improved chemical bond rather than any improvement in mechanical bonding. In the method of the present invention, this bond is not disturbed, so as to ensure that a good peel strength for the slider fabric is maintained. This is important at the joint in the slider since, necessarily, each end of the slider fabric will present a free end, which may tend to become snagged or caught on parts of the apparatus, tending to peel the ends away from the thermoplastic. Also, the temperature is maintained high enough to ensure that the various layers of thermoplastic merge completely with one another, so as to give a good peel strength between the various layers of thermoplastic.

The extrusion method just mentioned includes cooling the extruded handrail section predominantly from the outside. This effects prestressing of the profile, so as to provide good lip strength. This technique is preferably repeated in the method of the present invention by predominantly cooling the handrail joint from the outside. While a metal mandrel defining the T-shaped slot within the middle of the handrail section may provide some conductive cooling effect, no specific attempt is made to cool the mandrel from the interior, so again cooling is effectively just provided from the exterior, to provide good lip strength. As detailed below, it may be necessary to continuously heat the mandrel from the interior, to ensure that cooling does indeed occur mainly from the exterior.

BRIEF DESCRIPTION OF THE DRAWINGS

For a better understanding of the present invention and to show more clearly how it may be carried into effect, reference will now be made, by way of example, to the accompanying drawings, which show a preferred embodiment of the present invention and in which:

FIG. 1 shows a perspective, end view of the handrail;

FIG. 2 shows a side view, partly cut away of the end of the escalator handrail, along line 2—2 of FIG. 1;

FIG. 3 shows a perspective view of a band saw for cutting the handrail;

FIGS. 5a and 5b show two end parts of the handrail, prior to cutting an interlace pattern in the end parts;

FIG. 13 and 14 are side views similar to FIG. 2 showing interlace patterns for the side legs of the handrail.

DETAILED DESCRIPTION OF THE INVENTION

Figure 4A:
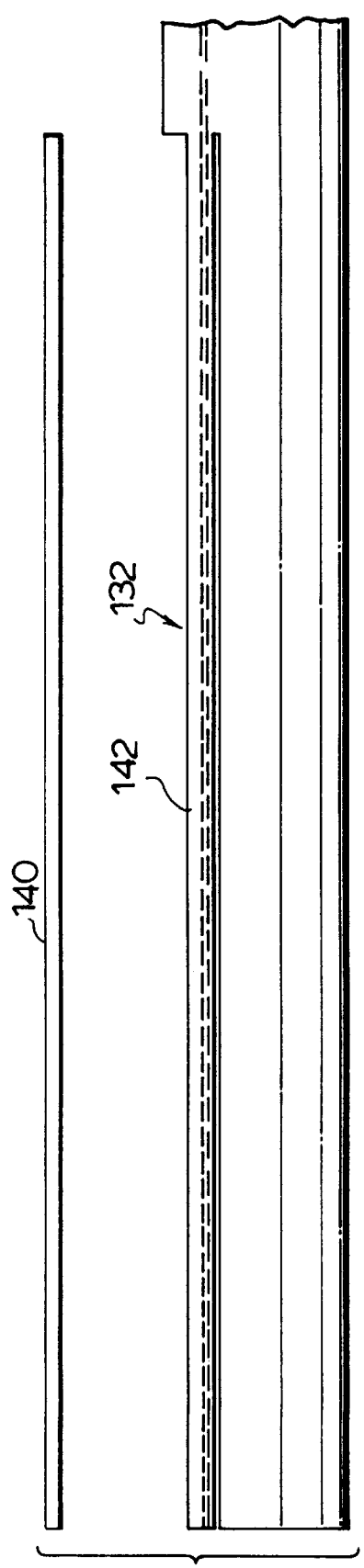
FIGS. 4a and 4b show successive cutting steps for one end part of a handrail.

An apparatus in accordance with the present invention is shown in FIGS. 8–12 and generally indicated by the reference 10. The apparatus 10 has a main, central molding section 12 and first and second protective end sections 14, 16.

The main and central section 12 comprises respective top and bottom parts 12a, 12b. Correspondingly, the protective end sections 14, 16 have top and bottom parts 14a, 14b, 16a, 16b. An elongate mandrel 18 is secured to the top part 12a. These individual parts or elements will now be described in greater detail.

The top part 12a is generally rectangular in plan. It comprises a main base portion 22. Extending along the length of the top part 12a there is a raised central portion 24. This raised central portion 24 has outer sides each having a vertical wall portion 26 and an inclined wall portion 28. The inclined wall portions 28 continue into a planar mating surface 30.

Cut into the mating surface 30 is an elongate trough 32 configured to correspond to the external profile of a handrail. At the bottom of the trough 32, there is a shallow rectangular slot 34. Further, at the bottom of the slot 34 there is a further shallow rectangular depression 36 into which bolt holes 38 open. The depression 36 serves as a pry slot, for prying the mold apart.

Additionally, on either side of the trough 32, there are two small, generally semi circular grooves 40 closely spaced from the trough 32 to accept excess material during molding.

Figure 8:
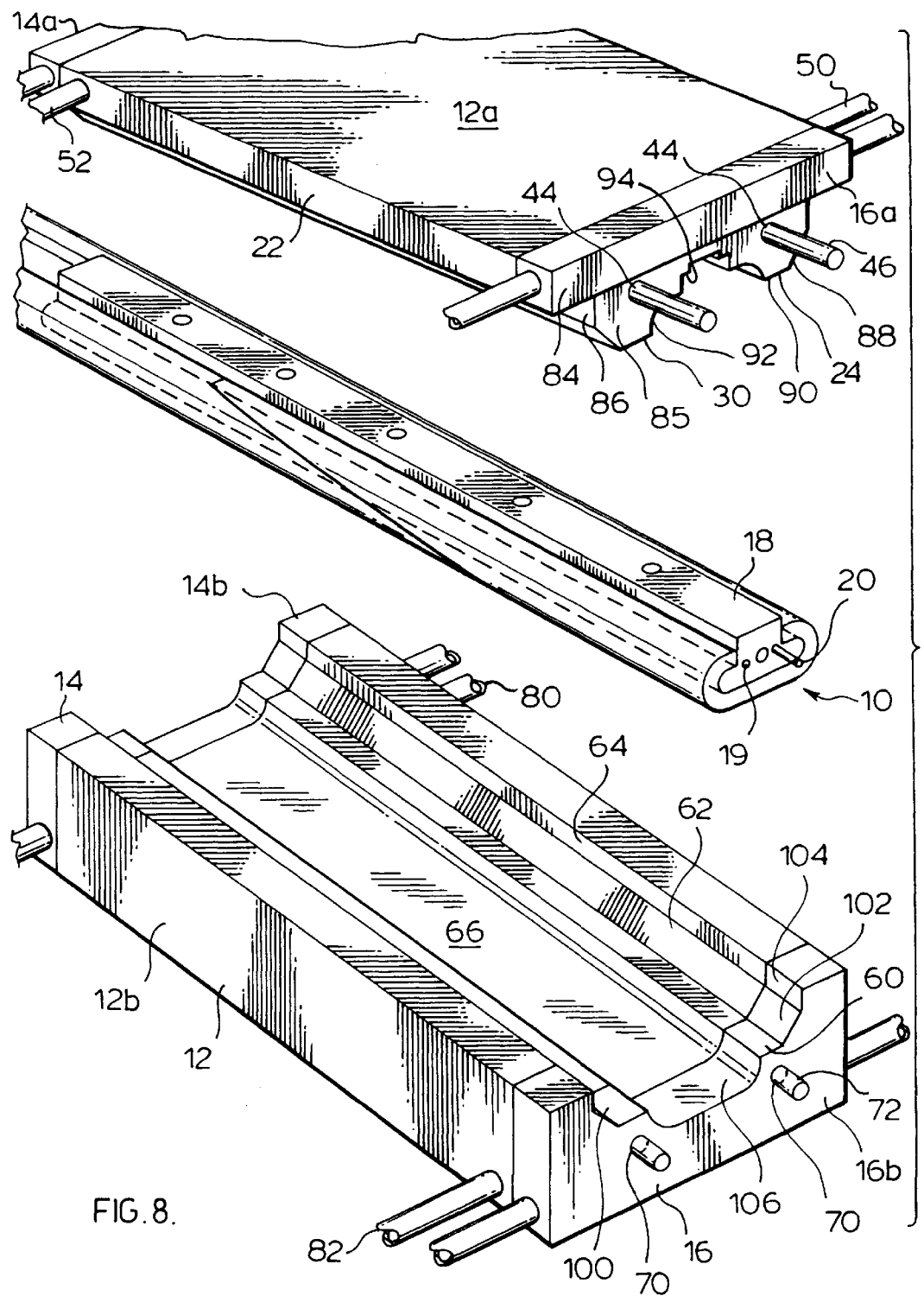
FIG. 8 is a perspective view showing an apparatus of the present invention in an open configuration.
Figure 9:
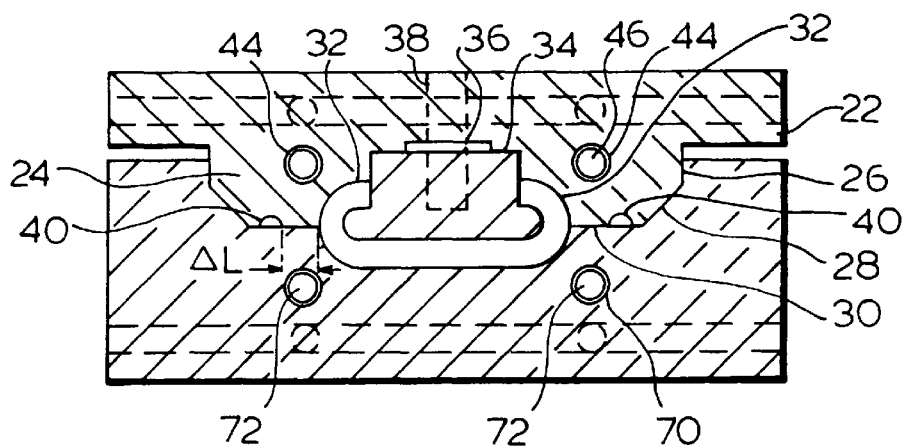
FIG. 9 is an end view of the apparatus of the present invention.

The mandrel 18 is secured by bolts (not shown) in the slot 34, as shown in FIG. 9. It is shown separated in FIG. 8, to show the structure, but in use would remain bolted to the top part 12a. With all the parts formed from aluminum or other metal, this can provide a good conductive path between the mandrel and the top part 12a. As detailed below, this can require continuous operation of mandrel heating elements to obtain the desired cooling scheme. Alternatively, the mandrel can be insulated from the top part 12a, by an insulating spacer or the like. As noted above, the depression 36 can be used to pry the mold apart, i.e. to pry the mandrel 18 from the top part 12a, when required.

The top part 12a includes elongate bores 44, in which are inserted electric heating elements 46.

The top part 12a also includes cooling ducts 48. (FIG. 10) The ducts 48 include two longitudinally extending ducts 48a and two transverse ducts 48b, connected to respective inlet and outlet ports 50, 52.

The bottom part 12b of the mold 12 is complementary to the top part 12a (FIG. 8). It has a mating surface 60, intended to abut the mating surface 30. Extending from this mating surface 60 are inclined walls 62 which continue into vertical walls 64. The walls 64 are intended to slidingly engage the vertical wall portions 26, so as to locate the parts 12a, 12b, laterally.

A rounded trough 66 is formed in the part 12b, corresponding to the trough 32, so as to form a complete mold cavity corresponding to the desired handrail section.

As for the top part 12a, the bottom part 12b includes bores 70 for heating elements 72. Each of the heating elements 46, 72 can be, for example, fifteen inches long and can have a power of 1,500 watts. It also includes a network of ducts (not shown), again comprising longitudinal ducts and transverse ducts, with the arrangement corresponding to that for ducts 48a, 48b. The transverse ducts are connected to inlet and outlet ports 80, 82 for providing cooling flow through the top part 12a, as detailed below.

The end sections 14, 16 generally correspond to one another, and for simplicity, just the first end section 16, as shown in FIG. 8 is described. As detailed below, the end sections 14, 16 are intended to be kept cool at all times, even when the central section 12 is heated. For this reason, they are thermally isolated from the central section 12. This is achieved by either forming all sections 12, 14 and 16 together, and then machining slots between the various sections. The end sections 14, 16 would then only be connected to the central section 12 by thin webs of material, to reduce significantly conductive heat transfer. Alternatively, the end sections 14, 16 are entirely separate and are connected to the central section in some suitable manner which minimizes heat transfer. Conveniently, the sections are formed together, by machining from aluminum.

Firstly, profiles of the top and bottom parts 16a, 16b of the end section 16, generally correspond to the main, central section 12. Thus, the top part 16a shows a main base portion 84 and a raised central portion 85. It has vertical wall portions 86 and inclined wall portions 88, continuing into a planar mating surface 90. Unlike the central section, the mating surface 90 is provided with no grooves for excess material. It includes a trough-shaped part 92, which provides a continuation of the trough 32. It also includes a rectangular slot 94 as a continuation of the slot 34 in the central section.

The bottom part 16b, correspondingly, has a mating surface 100 with inclined wall portions 102 and vertical wall portions 104. At the middle of the mating surface 100 there is a rounded trough 106, to complete the handrail section, and as a continuation of the trough 66.

Figure 10:
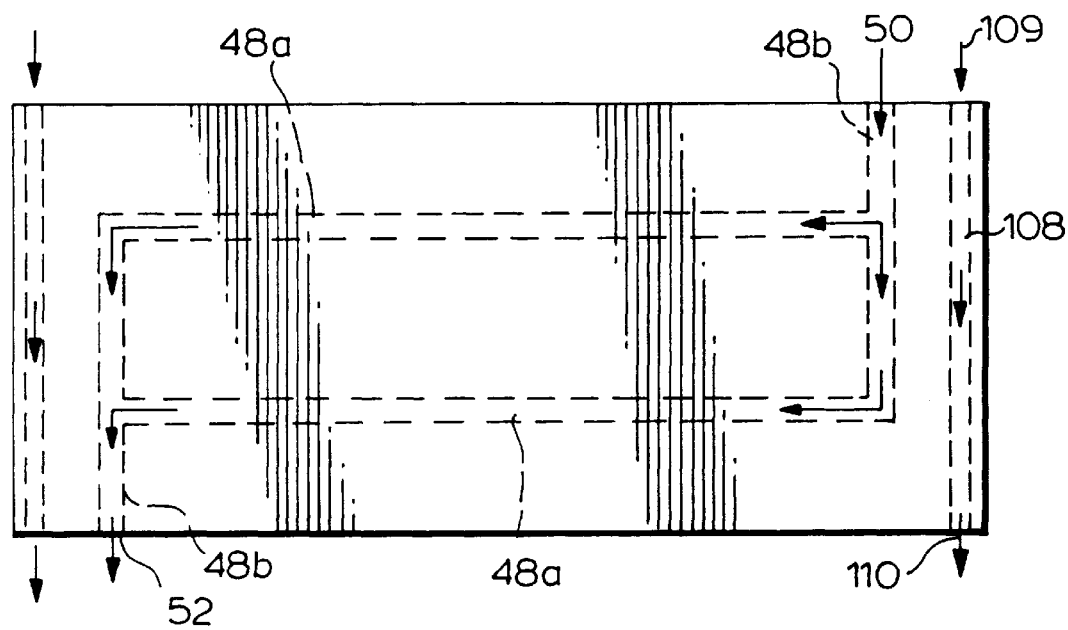
FIG. 10 is a plan view of the apparatus of the present invention showing cooling order paths.

The end parts 16a, 16b are provided with respective through bores with one shown at 108 in FIG. 10, for cooling water, and inlets and outlets 109, 110. They also include bores, for passage of heating elements.

The mandrel 18 includes bores 19, for electric heating elements 20. Each of the heating elements 20 can be, for example, twelve inches long and can have a power of 1,000 watts.

A description will now be given of the formation of a splice joint in a handrail, in relation to FIGS. 1–7. The end parts can be prepared using a bandsaw, knife, hot knife or other suitable or conventional cutting means. Here, the main handrail body is indicated at 120. This body 120 includes a top portion 122 and side legs 124. Within the top portion 122, there is a planar array of reinforcing cables 126 as elongate inextensible members. The handrail defines a generally T-shaped slot 128, which is lined with a slider fabric 130. The two end parts of the handrail are designated by the reference 131 and 132. The handrail is formed from a thermoplastic polyurethane elastomer (TPU), although it will be appreciated that any suitable thermoplastic could be used.

Two end parts 131, 132 are first cut, with straight, square cuts. Firstly, complementary portions of the side legs 124 are removed from the two end parts by means of corresponding inclined cuts 132, extending through just the side legs 124 of each end part. The cuts 132 are inclined so as to give an overall axial length of 6 to 8 inches. The second end part 132 will require the making of a complementary horizontal cut 136 immediately below the top portion 124.

For each end part, a part of the top portion 122, as indicated 140, is removed by a horizontal cut 142. This is effected by means of a band saw. As shown in FIG. 3, a jig 144 including a mandrel 146 is provided. The mandrel 146 conforms to and is a close fit within the T-shaped slot 128, so as to securely retain an end part 131 or 132 on the jig 144. The horizontal cut 142, or other cuts, such as the cuts 134 can then be made precisely. For this purpose, the mandrel 146 could be slotted, or the handrail can be otherwise supported. Note that instead of removing top parts 140, an interweave pattern can also be provided in the top.

Figure 6:
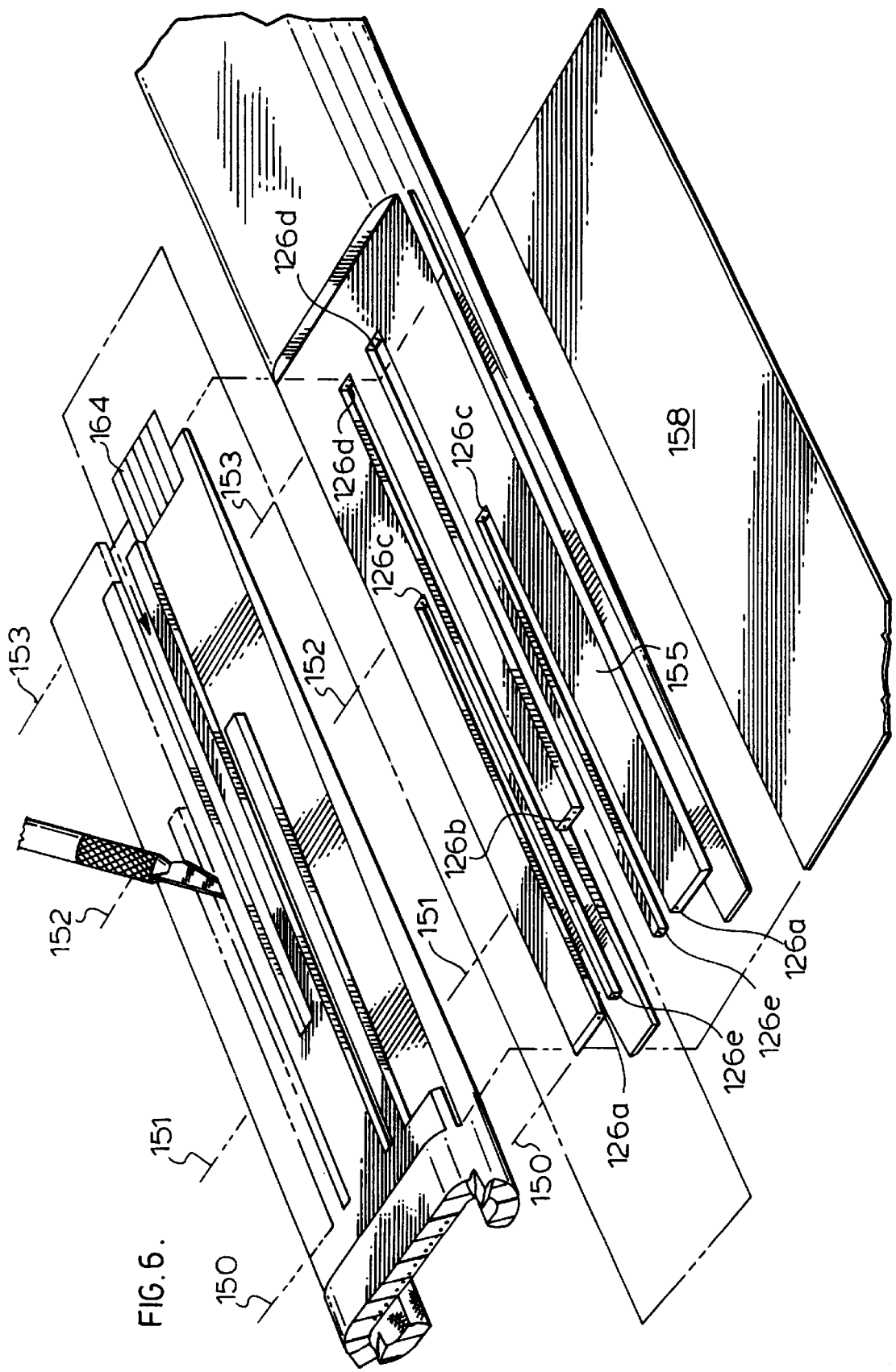
FIG. 6 is a perspective view of the two end parts of the handrail, showing cutting of an interlace pattern.
Figure 7:
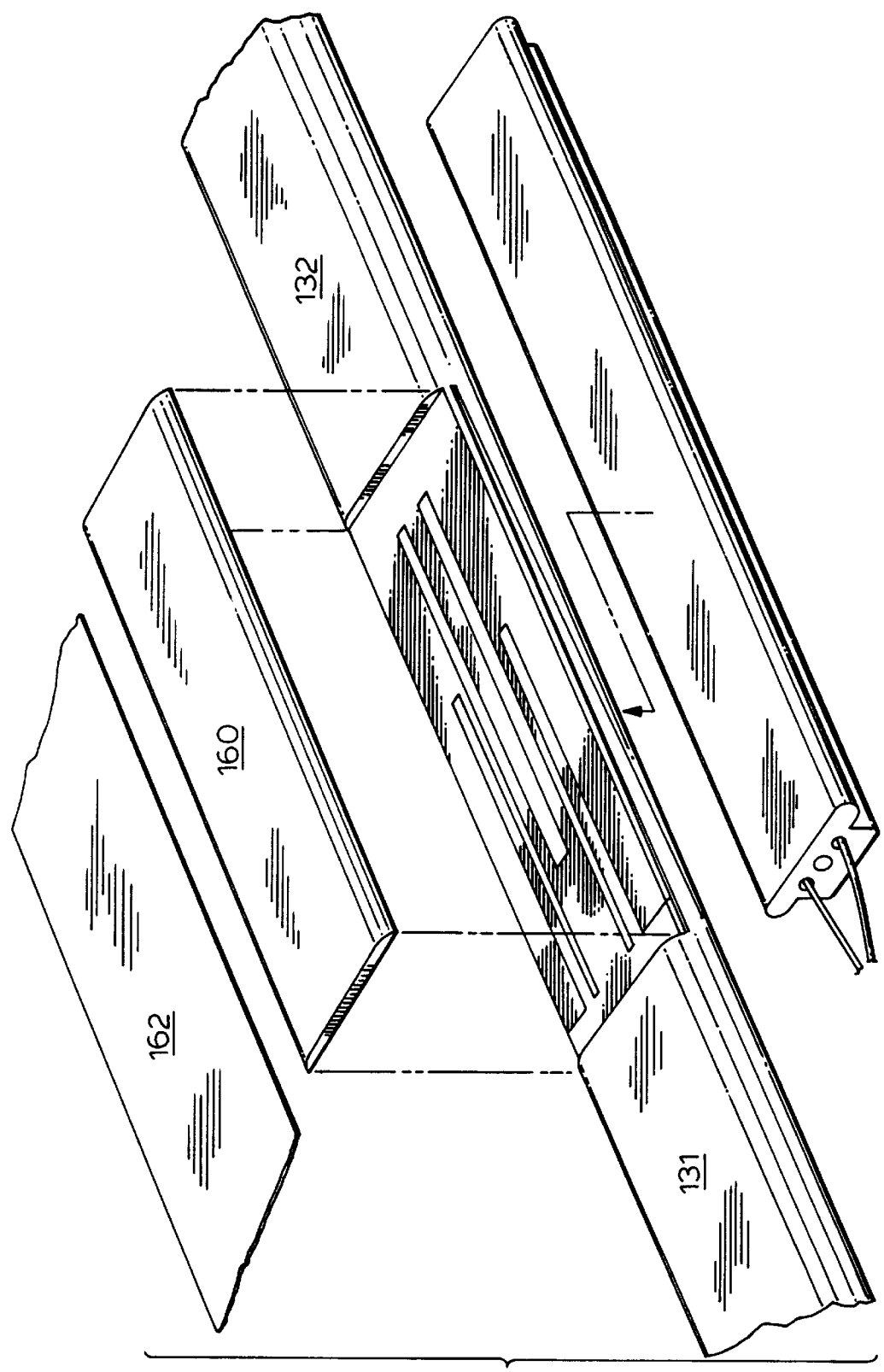
FIG. 7 is a perspective view showing assembly of the two end parts, and a mandrel forming part of the apparatus of the present invention.

This cut 142 is made immediately above the array of cables 126. Together with two transverse vertical end cuts, this removes a top layer from both end parts 131, 132. This then leaves a thin, bottom part 148 of the top portion 122, as an intermediate layer containing cables 126 in each of the handrail end parts 131 and 132. These bottom parts are then cut to form a desired interlace pattern, as best shown in FIGS. 6 and 7.

Now, it will be appreciated that, in known manner, a key factor in determining the strength of an interlace pattern is the strength of the cables and the relative shear strength between the cables and the polymer of the handrail. These two factors together determine what length of the cable is required to be embedded in the polymer, in order that, when increasing load is applied to the cable, failure will occur through breakage of the cable, rather than failure of the bonding of the cable to the polymer. An ideal interlace pattern has the cables overlapped sufficiently that the cable joints are spaced apart by more than this critical distance. Referring to FIG. 6 it can be seen that there are four planes 150, 151, 152 and 153, at which there are cable breaks. In plane 150, there is a break in the two outer cables 126a and two intermediate cables 126e. In plane 151, there is a break in the three central cables 126b. At plane 152, there is a break in four outer cables 126c, arranged in pairs adjacent the outermost cables 126a. At the plane 153, there is a break in four inner cables 126d, arranged in pairs on either side of the three central cables 126b. It will be appreciated that while a preferred interlacing arrangement is shown, any suitable arrangement can be provided. It can be noted that corresponding to the plane 150, edge parts 155, including the outer cables 126a, of the second end part 132 are retained, but are removed for the first end part 131.

The interlacing pattern is cut not just with reference to the cables but with reference to the cables as embedded in the polymer. As detailed below, the polymer is to be remelted during the final splicing step. Rather, each cable is cut, or group of cables cut, to incorporate a corresponding portion of the body of the handrail. This is shown in FIGS. 6 and 7. Accordingly, when the two end parts are assembled together, in the plane of the cables, there are essentially no voids, other than reasonable tolerances resulting from cutting, and there is no need, apart from such tolerances etc. to replace any of the body of the handrails around the cables. A further advantage of this technique is that it ensures that adhesive between the cables and the thermoplastic is not damaged or removed during formation of the interlace pattern.

Figure 4B:
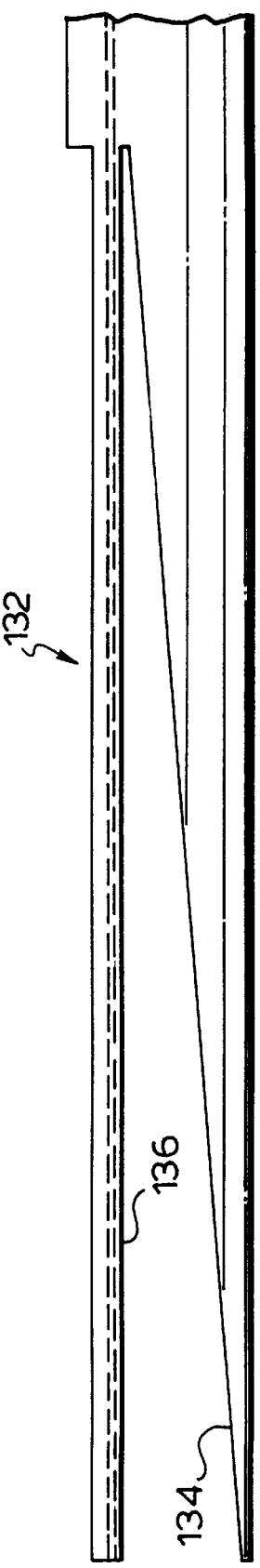

While FIGS. 4a and 4b show an inclined splice for the portion of the handrail including the slider fabric, it will be appreciated that a number of different joint mechanisms can be provided in the side legs 124 of the handrail. Alternative profiles are shown in FIGS. 13 and 14.

In FIG. 13, there is shown an arrangement that provides for a number of generally rectangular fingers or projections on each end which are interwoven or interdigitated. As for the top portion, these are defined relative to a number of vertical planes. A central plane 170 has, on one side planes 171 and 172, and on the other side, planes 173 and 174. It will first be appreciated that, while vertical planes are shown, this is not essential. It is possible to use a variety of inclined planes, and not all the planes need be parallel to one another; the planes could be inclined either as seen from the side, or as viewed in plan. Thus, there are top and bottom fingers 175 and 176, extending from the two ends and two middle fingers 177 and 178. Again, the ends of the fingers terminate in different planes, to provide a desired stress pattern and to transfer longitudinal tension loads, in shear, between the adjacent fingers.

FIG. 14 shows an alternative arrangement using triangular fingers. Again, the whole joint is defined in relation to a central plane 172, and planes 171–174 on either side. Top and bottom, triangular fingers or projections 180 and 181 extend to the planes 172 and 173 closest to the central plane 170, while two triangular fingers 182 and 183 extend to the outermost planes 171 and 174. As before, for the joints above FIGS. 13 and 14, the necessary cuts can be formed by sawing, cutting with hot or cold knives, or otherwise, as appropriate. To reinforce the joint, a saddle or patch can be provided for the slider fabric 130, and such a saddle is indicated at 164 in FIG. 6. The saddle 164 could be wide enough to cover just the planar portion of the slider 130, i.e. so as not to extend down into the side legs 124. The length of the saddle 164 should be such as to provide adequate reinforcement. The saddle 164 would be a sheet cut from the slider fabric 130 and prepared by coating with TPU, which can be done manually or otherwise. When placed into the assembled splice, allowance should be made for the volume of the saddle 164.

The end parts 131, 132 are then assembled in the mold apparatus 10. The section at the joint is then complete. In the case where material is removed by saw cuts: a replacement sheet 158 allows for the material removed by the cuts 136. A replacement top cap 160 replaces the parts 140 removed from each end part. This replacement cap 160 is cut with a band saw or knife or hot knife; and allowance is made when cutting it, for the thickness of the band saw if used; i.e. the kerf which is removed material from the end parts 131, 132; where a knife is used, such an allowance is not required. More complex handrail constructions may have one or more internal fabric plies. Then, the ends of the handrail are prepared in the same manner, with each additional ply of fabric being separated from the handrail by horizontal cuts above and below it. The plies of fabric can be joined in an abutting or overlapping configuration. The joints are spaced longitudinally from one another along the handrail, so as not to be aligned with one another. Generally, these additional plies are provided to improve the lip strength of the handrail, and not the longitudinal strength, so that the strength of the longitudinal joint for these plies is not critical. However, for some applications, it may be desirable to provide some form of interlocking fingers, as for the joints described above, for additional fabric plies.

It has been found that, while a satisfactory joint can be made with the end parts reassembled in this manner, the joints between the individual elements are revealed in the finished joint by dark lines, ie. the original colour of the handrail is not smooth and continuous. Purely for aesthetic reasons, a thin sheet of the polyurethane elastomer, identical to the material of the handrail, is placed over the top of the joint, as indicated at 162. With all this material assembled in the bottom part 12b of the mold, the top part 12c is located on the top and the mold is closed under pressure.

Figure 11:
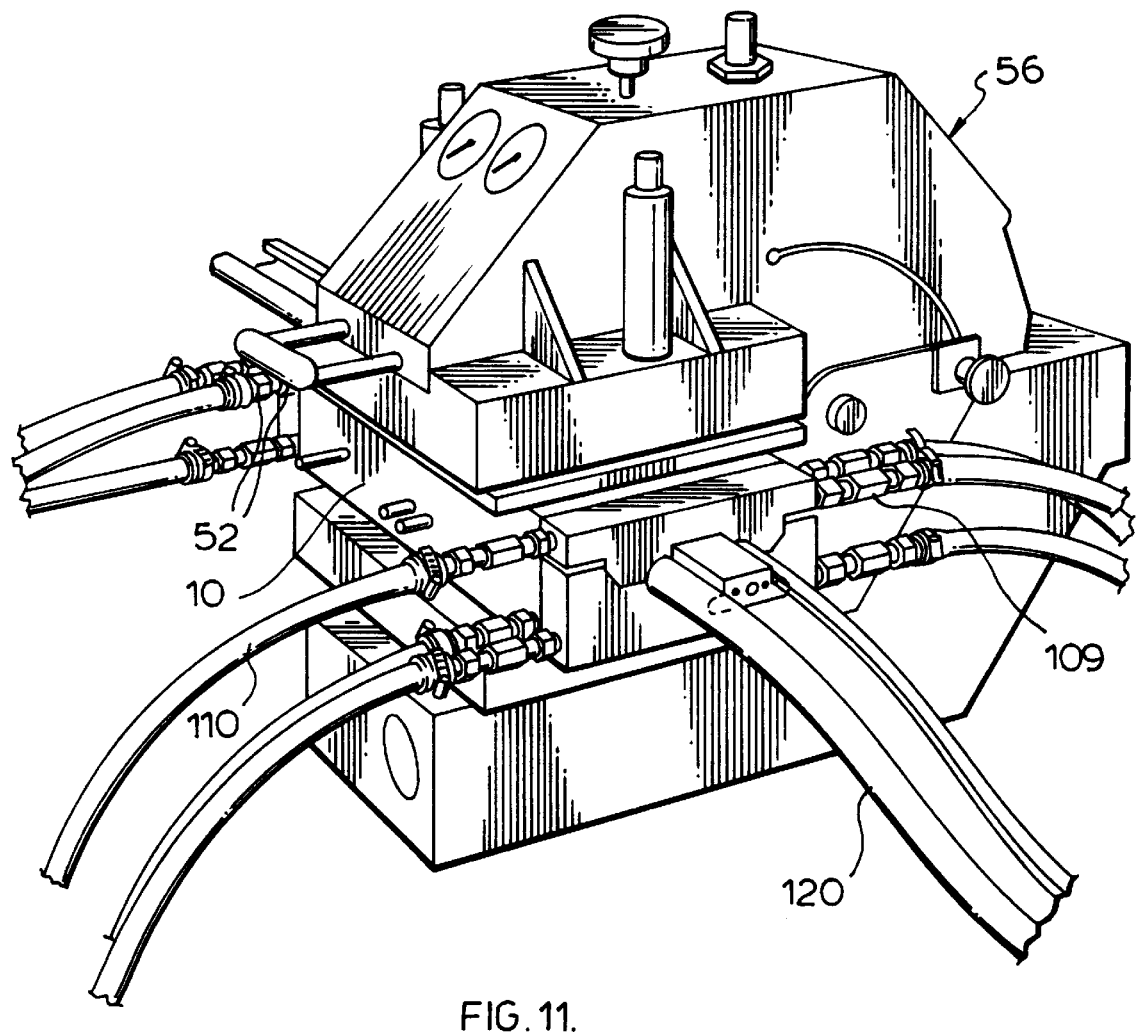
FIG. 11 is a perspective view of the apparatus of the present invention in a press.
Figure 12:
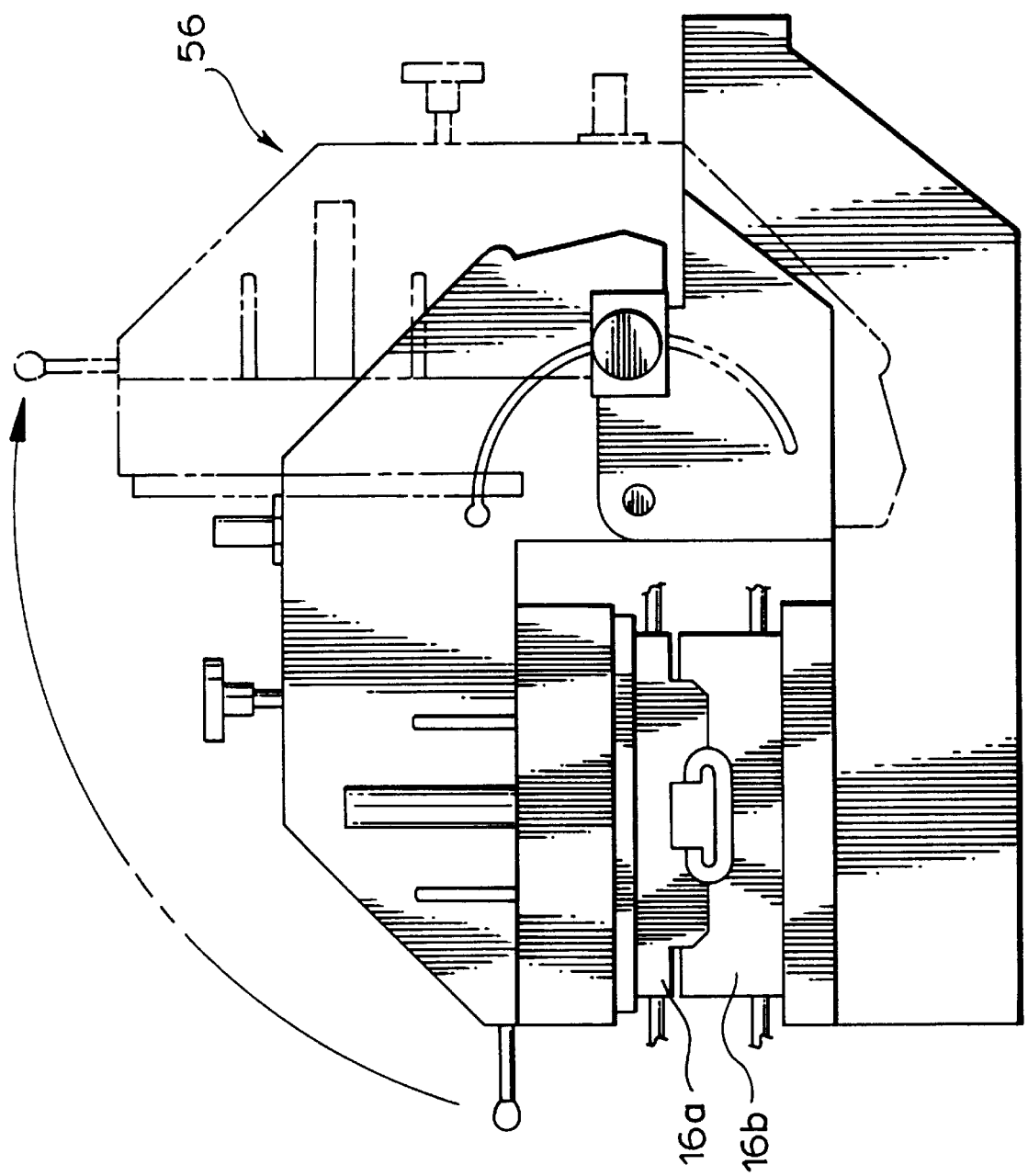
FIG. 12 is a perspective view of the apparatus and the press, showing movement between open and closed positions.

Any standard pressure tool can be used and FIGS. 11 and 12 show a press-tool 56, which has a top part pivotable between open and closed positions. Here, the total load applied is approximately 4,000 lb for a mold of 18"×8" dimensions. As detailed below, the pressure should be sufficient to maintain the mold closed, while permitting excess material to escape. As detailed below, the mold is slightly oversized, so that initially the TPU is not pressurized and the 4,000 lb load is carried through the mold.

Cooling water is then passed through both the top and bottom parts of the first and second protective end sections 14, 16. The function of this is to keep the portions of the handrail in the ends 14, 16 cool to prevent the handrail remelting at this point. Simultaneously, the heating elements are energized, so as to heat the main central section 12. This remelts the polymer within the central section 12, causing it to bond together and form a unified joint.

Now, it is known that TPU is strongly hygroscopic, and for this reason, when extruding the initial handrail, conventional precautions have to be taken to ensure that the TPU is dry before passing through the extrusion die. Otherwise, the temperature in the die assembly will cause any remaining water to vaporize, when the handrail leaves the die and is subject only to atmospheric pressure; this would cause bubbles to appear within the extruded article. However, after extrusion, the finished handrail would, in a relatively short time absorb moisture from the atmosphere. Accordingly, care needs to be taken when remelting the handrail to form the spliced joint, to ensure that vaporization of water and generation of vapour bubbles does not occur, and the pressure is selected accordingly.

To this end, the mold is dimensioned so that, before thermal expansion causes the end parts to expand significantly, they contact the interior of the mold, which then pressurizes the TPU. More particularly, the dimensions are such that at all times while the end parts are molten, the pressure is sufficient to prevent the generation of vapor bubbles, i.e. the end parts will be pressurised before they melt as vapor bubbles can only be released from molten thermoplastic. The pressure will be determined by the applied load and the dimensions of the mold. Thus, in an equilibrium state when the entire load of 4,000 lbs is carried through the TPU, the load of 4,000 lbs will equal the average pressure within the TPU times the width of the handrail, times the portion of the length of the mold on which the molten thermoplastic acts. As the portions adjacent the end parts are kept cool and do not melt, they will not exert pressure on the mold. The clearance in the mold is chosen so that the pressure thus generated will prevent generation of vapour bubbles at the temperature for forming the splice.

Now, if there is any excess material, this simply opens the mold slightly; that is, the top and bottom central parts 12a, 12b will ease apart slightly in the vertical direction, to permit excess material to flow out to the grooves 40. It will be appreciated that, there will be a pressure drop ΔP between the main handrail section and the grooves 40. This pressure drop ΔP will be a function of the flow rate of material, the width of the channel forced between the two parts of the mold, and the length, ΔL (marked in FIG. 9) between the main cavity in the mold and the grooves 40. In general, the pressure drop ΔP will be the difference between the pressure within the main cavity of the mold and ambient pressure.

However, it will be realized that, when the mold opens slightly and material is flowing to the grooves 40, the area of the mold, as seen in plan view, on which the pressure of the molten TPU acts is increased. Thus, the molten TPU will act not only within the cavity, but also on the surfaces defining channels extending out to the grooves 40. As a constant load, here 4,000 lbs, is maintained, then the average pressure within the mold must necessarily drop slightly. Nonetheless, the pressure is still sufficient to prevent any moisture from turning into steam or vapour bubbles.

When sufficient excess TPU has flowed outwardly to the grooves 40, the two mold parts will reclose, nipping off the flow. Again, the pressure within the cavity will be determined such that the pressure multiplied by the length (acted upon by the molten material) and width of the mold is equal to the applied load.

The mold is heated to a sufficient temperature here 165° C., and this is held for, a sufficient time, here 20 minutes. At the end of this time, all the heating elements are turned off, except for the heating elements 20 for the mandrel 18, and cooling water is then passed through the top and bottom parts 12a, 12b, to resolidify the material around the actual joint. In this embodiment, the heating elements 20 are still operated, because there is no insulation between the mandrel 18 and the top part 12a. This prevents premature cooling through the mandrel 18. Sixty seconds before cooling commences, the temperature setting for the elements 20 is increased to a temperature sufficient to cause the elements 20 to operate continuously, i.e. the temperature never manages to reach the set temperature before cooling begins. The elements 20 are operated continuously for three minutes after cooling commences, to ensure that initial cooling is from the exterior. The elements 20 are then turned off, and cooling continues. It takes about thirteen minutes to completely cool the spliced joint. The cooling water can then be turned off and the mold opened. When required, the mandrel 18 can be separated from the top 12a by use of the pry slot 36.

As the TPU cools, it shrinks and the pressure reduces down to ambient. As detailed below, cooling essentially occurs just from the exterior, to effect prestressing of the lips of the handrail. At all times, the pressure is sufficient to prevent steam bubbles forming. When the joint has been sufficiently cooled all the water flows are turned off, any heating elements still operative are turned off, the mold is opened, and the mandrel is removed from the T-shaped slot. If there is any excess material present, this is readily trimmed with a knife and the edges of the handrail can be quickly and simply cleaned up, so that the handrail then presents a smooth uniform appearance, and the joints should be undetectable to an ordinary user. The interlacing of the cables provides a strong joint having characteristics comparable to the main body of the handrail.

The original handrail section can be provided with a good peel strength between the slider fabric and the thermoplastic. It is important to maintain a good peel strength for all the layers. The ends of the slider fabric are most prone to being snagged or caught or subject to forces tending to peel them off the TPU. The peel strength for the slider fabric is maintained during splicing of the joint, by deliberately not removing the thermoplastic layer adjacent the slider fabric, so as not to interfere with the mechanical and chemical bonds formed. Also, during formation of the splice, the temperature is maintained high enough to ensure good integration of the various layers of the thermoplastic, so that the thermoplastic layers merge completely with one another throughout the splice.

One aspect of a suitable handrail extrusion technique is to prestress the handrail, by cooling it initially from the exterior only. This prestresses the lips or side legs 124, so as to provide improved lip strength. This same cooling effect is found here. The joint is essentially cooled from the exterior. While the mandrel 18 is secured to the top part 12a, the thermal paths are relatively long and inefficient. Thus, cooling commences primarily from the exterior, with the interior layers of the joint cooling later. This again reproduces the prestressing, so as to maintain adequate lip strength along the length of the joint, and more particularly a lip strength comparable to that in the original handrail.

The preferred material for the handrail is a polyurethane thermoplastic elastomer. Such material adheres well to the cables, provides a good gloss finish which is durable and wear resistant, shows good resistance to tearing, and good adhesion to the slider fabric. However, thermoplastic polyurethane expands significantly when heated. For this reason, the mold is made oversized by an amount in the range 5–15 thousandths of an inch on a radius, i.e. in each direction in the range 10–30 thousandths of an inch across the full width etc., as compared to the dimensions of the handrail at ambient temperature. This oversizing is along the whole length of the mold, which has proven satisfactory. Preferably, the oversizing is at the low limits of the ranges given. Providing a uniform sizing along the length of the mold has been found to give a uniform finish to the splice and the splice is not visually noticeable. Accurate measurement along the length of the splice may show dimensional variations of the order of a few thousandths of an inch, but as these occur over distances of the order of a few inches, they are not detectable to an ordinary user.

It is important when forming the interlace pattern for the joint, that the different portions of the pattern be cut reasonably exactly, so that the amount of material present corresponds to that needed to refinish the joint. If there is too much material present, so that there is substantial flow out through the edges of the mold, then the flow sideways tends to displace the cable ends sideways. This displaces the cable ends and significantly distorts the joint, so as to affect the mechanical properties of the joint. Ideally, any flow of excess material is minimal, so that the cable ends remain substantially unmoved, with the cable ends aligned with one another and in a desired array, to give a strong joint.

The inclined cuts 134, or other formation in the slider fabric, are provided, so as to avoid a purely square cut in the slider fabric 130, which ideally is a woven spun polyester. This has been found to bond well to the polyurethane. By providing an inclined cut, it is believed that the joint will travel more smoothly and be less susceptible to damage in use. Also, this effectively enables tension loads to be transferred across the joint in the slider fabric 130. If a square or butt joint is provided in the fabric 130, tension loads, e.g., when the handrail is bent backwards in some drive assemblies, will tend to open the joint.

While the invention has been described in relation primarily to handrails, it is to be appreciated that it is applicable to any article formed from a thermoplastic material and having a constant cross-section. For example, it could be applied to conveyor belts, which often have many properties similar to handrails. Typically a conveyor belt will include reinforcing cables or other stretch inhibitor, to give the desired strength and elastic properties to the conveyor belt. It may often include a fabric layer bonded to one side of it. A conveyor belt typically has a simple rectangular section, so it is a simple matter of forming an interlace pattern through the complete depth of the conveyor belt, and then assembling this together in a suitable mold.

We claim:

1. A method of forming a joint in an elongate article, which has a body of generally uniform cross-section, is formed from a hygroscopic thermoplastic material containing water and has end parts and which includes a plurality of elongate inextensible members, the method comprising the steps of:

(1) cutting the inextensible members in each end part to at least two different lengths together with a corresponding portion of the material of the body of the article, to form an interlace pattern at the joint, with the inextensible members terminating in a plurality of planes transverse to the elongate article, wherein said corresponding portions are cut such that the ends of the elongate inextensible members are aligned with one another so that a bond between the elongate inextensible members and the thermoplastic material is not disturbed;

(2) placing the end parts of the article in a mold comprising at least two mold parts displaceable between open and closed configurations and defining an elongate mold cavity with a cross-section corresponding to the cross-section of the article, interlacing said corresponding portions together, such that there are no substantial voids and enclosing the end parts of the article within the mold cavity, the two mold parts being separable and displaceable relative to one another in a direction generally perpendicular to the elongate mold cavity;

(3) while maintaining portions of the article adjacent the end parts cool, to prevent melting thereof, heating the end parts of the article to provide temperature conditions along the mold such that the article expands and contacts the mold to pressurise the end parts, before the thermoplastic melts;

(4) while continuing to maintain portions of the article adjacent the end parts cool, to prevent melting thereof, further heating the end parts of the article to melt the thermoplastic material, thereby to form molten end parts and to fuse the end parts together, and simultaneously pressing the two mold parts together into the closed configuration to pressurize the molten end parts within the mold cavity to a pressure high enough to prevent vaporization of water in the molten end parts; and (5) while continuing to maintain said portions of the article adjacent the end parts cool and pressing the mold parts together, cooling the molten end parts of the article to resolidify the material and to form a joint.

2. A method as claimed in claim 1, which comprises forming the interlace pattern in an intermediate layer of the article extending into both end parts of the article, wherein the end parts of the elongate inextensible members and associated portions of the body of the article substantially fill the intermediate layer and leave no substantial voids.

3. A method as claimed in claim 2, wherein a second, top layer is defined in the end parts, adjacent and above the intermediate layer, and which further comprises, during cutting of the end parts to form the interlace pattern, removing the portions of the end parts forming the second, top layer and, to complete the joint, providing a top cap portion, corresponding to the second layer, and inserting the top cap portion into the mold.

4. A method as claimed in claim 2, wherein the elongate article comprises a handrail, whose body has a generally C-shaped external section and defines an internal T-shaped slot, the handrail including an internal slider fabric around the T-shaped slot, the slider fabric having an original peel strength with respect to the body of the handrail, and the handrail having, in cross-section, a main top portion and side legs extending down therefrom around the T-shaped slot with the inextensible members being located in the top portion above the T-shaped slot, wherein the method comprises forming the interlace pattern in the top portion of the handrail.

5. A method as claimed in claim 4, which comprises forming the interlace pattern in an intermediate layer of the top portion above the slider fabric.

6. A method as claimed in claim 5, wherein the end parts of the handrail, above the intermediate layer, include a second, top layer, and the method further comprises removing the second top layer during formation of the interlace pattern and providing a top cap portion of the handrail to complete the cross-section and inserting the top cap portion into the mold.

7. A method as claimed in claim 6, which includes each end part, cutting a lower portion including the slider to form a pattern selected from one of: an inclined joint in the slider fabric; and an interdigitated pattern.

8. A method as claimed in claim 7, wherein, in step (3), the method includes heating the end parts of the article to a temperature such as to form a bond between the thermoplastic material layers, which provides a peel strength comparable to the original peel strength.

9. A method as claimed in claim 7, which includes forming an inclined joint in the handrail, and, in forming the inclined joint, making a horizontal cut having a thickness beneath each intermediate layer, the method further including providing a replacement bottom sheet to allow for the thickness of the cut.

10. A method as claimed in claim 4 or 9, the method including providing a thin cover sheet over the top of the handrail in step (1), the cover sheet having the same colour as the material of the handrail, to cover the joint.

11. A method as claimed in claim 4, wherein the mold cavity is dimensioned so as to be slightly oversized as compared to the cross-section of the handrail at ambient temperature, the cross-section of the mold being such that a resultant joint has dimensions generally similar to dimensions of the original handrail.

12. A method as claimed in claim 4, wherein the method comprises applying an external pressure to the end parts that permits any excess thermoplastic material to displace the mold parts to enable the excess material to flow out of the mold cavity, whereby internal pressure within the cavity is reduced sufficiently to enable the mold parts to resume the closed configuration.

13. A method as claimed in claim 4, 11 or 12, which comprises, in step (3), cooling the handrail from the exterior, so as to prestress the handrail at the joint and provide improved lip strength.

14. A method of forming a joint in an elongate handrail having a generally C-shaped external section and defining an internal T-shaped slot, the handrail comprising a body of generally uniform cross-section formed from a thermoplastic material and having end parts, an internal slider fabric around the T-shaped slot and a plurality of elongate inextensible members extending in the body above the T-shaped slot, the method comprising the steps of:

(1) providing a mold comprising first and second mold parts displaceable between open and closed configurations and a mandrel having a cross-section corresponding to the internal T-shaped slot of the handrail, the mandrel being mountable between the first and second mold parts, whereby the first and second mold parts and the mandrel define an elongate mold cavity with a cross-section corresponding to the cross-section of the handrail, and the two mold parts being separable and displaceable relative to one another in a direction generally perpendicular to the elongate mold cavity;

(2) cutting the inextensible members in each end part to at least two different lengths together with a corresponding portion of the material of the body of the handrail, to form an interlace pattern at the joint, with the inextensible members terminating in a plurality of planes transverse to the elongate handrail, wherein said corresponding portions are cut such that the ends of the elongate inextensible members are aligned with one another and such that a bond between the elongate inextensible members and the thermoplastic material is not disturbed;

(3) inserting the mandrel into the T-shaped slot of the end parts, interlacing said corresponding portions together such that there are no substantial voids and enclosing the end parts of the handrail and the mandrel within the mold cavity;

(4) while maintaining portions of the handrail adjacent the end parts cool to prevent melting thereof, heating the end parts of the handrail around the mandrel to melt the thermoplastic material, thereby to form molten end parts and to fuse the end parts together, and simultaneously pressing the two mold parts together into the closed configuration to pressurize the molten end parts within the mold cavity;

(5) while continuing to maintain said portions of the handrail adjacent the end parts cool and pressing the mold parts together, cooling the molten end parts of the handrail to resolidify the thermoplastic material and to form a joint in the handrail; and (6) opening the first and second mold parts and removing the mandrel from the T-shaped slot.

15. A method as claimed in claim 14, which comprises forming the interlace pattern in an intermediate layer of the handrail extending into both end parts of the handrail, whereby the interlace pattern does not extend into layers of the handrail above and below the intermediate layer.

16. A method as claimed in claim 15, wherein a second, top layer is defined in the end parts, adjacent and above the intermediate layer, and which further comprises, during cutting of the end parts to form the interlace pattern, removing the portions of the end parts forming the second, top layer and, to complete the joint, providing a top cap portion, corresponding to the second layer and inserting the top cap portion into the mold.

17. A method as claimed in claim 15, which includes, for each end, cutting a lower portion including the slider to form a pattern selected from one of: an inclined joint in the slider fabric and an interdigitated pattern.

18. A method as claimed in claim 15 or 17, which includes providing a saddle for the slider extending over at least part of the width of the handrail.

19. A method as claimed in claim 15, wherein in step (4), the method includes heating the end parts of the handrail to a temperature such as to form a bond strength between the thermoplastic material layers which provides a peel strength comparable to the original peel strength.

20. A method as claimed in claim 19, which includes forming an inclined joint in the handrail, and making a horizontal cut having a thickness beneath each intermediate layer, the method further including providing a replacement bottom sheet to allow for thickness of the cut.

21. A method as claimed in claim 20, which includes providing a thin cover sheet over the top of the handrail in step (2), the cover sheet having the same colour as the material of the handrail to cover the joint.

22. A method as claimed in claim 21, wherein the handrail is formed from a hygroscopic thermoplastic, and wherein the method includes providing temperature conditions along the mold such that the handrail expands and contacts the mold to pressurize the end parts, before the thermoplastic melts, and pressing the mold parts together so as to pressurize the end parts to a pressure high enough to prevent vaporization of any water in the molten end parts.

23. A method as claimed in claim 22, wherein the mold cavity is dimensioned so as to be slightly oversized as compared to the cross-section of the handrail at ambient temperature, the cross-section of the mold being such that a resultant joint has dimensions generally similar to dimensions of the original handrail.

24. A method as claimed in claim 23, which comprises, in step (3) heating the handrail from the exterior through the first and second mold parts and from the interior through the mandrel, and subsequently, in step (4) terminating heating of the end parts, and cooling the end parts only from thee exterior, so as to prestress the handrail at the joint and provide improved lip strength.

* * * * *